United States Patent
Kim et al.

(10) Patent No.: US 9,209,940 B2
(45) Date of Patent: Dec. 8, 2015

(54) METHOD OF RETRANSMISSION FOR SUPPORTING MIMO IN SYNCHRONOUS HARQ

(75) Inventors: Bong Hoe Kim, Anyang-si (KR); Byeong Woo Kang, Anyang-si (KR); Dae Won Lee, Anyang-si (KR); Yu Jin Noh, Anyang-si (KR); Dong Wook Roh, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 790 days.

(21) Appl. No.: 13/255,221
(22) PCT Filed: Mar. 16, 2010
(86) PCT No.: PCT/KR2010/001624
§ 371 (c)(1), (2), (4) Date: Nov. 21, 2011
(87) PCT Pub. No.: WO2010/107232
PCT Pub. Date: Sep. 23, 2012

(65) Prior Publication Data
US 2012/0057451 A1 Mar. 8, 2012

Related U.S. Application Data

(60) Provisional application No. 61/160,344, filed on Mar. 16, 2009, provisional application No. 61/181,291, filed on May 27, 2009, provisional application No. 61/224,065, filed on Jul. 9, 2009, provisional application No. 61/252,150, filed on Oct. 15, 2009.

(30) Foreign Application Priority Data

Dec. 18, 2009 (KR) .................. 10-2009-0126951
Mar. 16, 2010 (KR) .................. 10-2010-0023223

(51) Int. Cl.
*H04W 4/00* (2009.01)
*H04L 1/18* (2006.01)
(Continued)

(52) U.S. Cl.
CPC ............ *H04L 1/06* (2013.01); *H04L 1/1887* (2013.01); *H04B 7/0413* (2013.01); *H04B 7/0623* (2013.01); *H04L 1/1812* (2013.01)

(58) Field of Classification Search
None
See application file for complete search history.

(56) References Cited

U.S. PATENT DOCUMENTS

2006/0182199 A1  8/2006  Hong et al.
2007/0255993 A1* 11/2007 Yap et al. ............... 714/748
(Continued)

FOREIGN PATENT DOCUMENTS

KR  10-2006-0091578 A  8/2006
KR  10-2008-0086857 A  9/2008
(Continued)

*Primary Examiner* — Kodzovi Acolatse
(74) *Attorney, Agent, or Firm* — Birch, Stewart, Kolasch & Birch, LLP

(57) ABSTRACT

A method for retransmitting data in synchronous Hybrid Automatic Repeat reQuest (HARQ) to support Multiple Input Multiple Output (MIMO) is disclosed. The method includes transmitting a plurality of unit data blocks to a receiver, receiving from the receiver a control channel signal including first feedback information indicating whether the transmission of the plurality of unit data blocks is successful, and retransmitting at least one of the plurality of unit data blocks according to a predetermined order, each unit data block in one Transmission Time Interval (TTI), if a rank is 1 and the first feedback information indicates that the transmission of the plurality of unit data blocks is failed.

8 Claims, 9 Drawing Sheets

(51) Int. Cl.
 *H04L 1/06* (2006.01)
 *H04B 7/04* (2006.01)
 *H04B 7/06* (2006.01)

(56) References Cited

U.S. PATENT DOCUMENTS

| | | |
|---|---|---|
| 2008/0232307 A1 | 9/2008 | Pi et al. |
| 2009/0098876 A1* | 4/2009 | Khan et al. .................... 455/445 |
| 2009/0305698 A1* | 12/2009 | Zhang et al. .................. 455/434 |
| 2010/0061475 A1* | 3/2010 | Mo et al. ....................... 375/261 |
| 2010/0115358 A1* | 5/2010 | Kotecha et al. ............... 714/748 |
| 2010/0195614 A1* | 8/2010 | Nimbalker et al. ........... 370/330 |
| 2010/0215109 A1* | 8/2010 | Onggosanusi et al. ....... 375/260 |
| 2010/0290420 A1* | 11/2010 | Dalsgaard et al. ......... 370/329 |

FOREIGN PATENT DOCUMENTS

| | | |
|---|---|---|
| KR | 10-2008-0110838 A | 12/2008 |
| KR | 10-2008-0111378 A | 12/2008 |
| WO | WO 2007-109634 A1 | 9/2007 |

* cited by examiner

[Rank=1 => Rank=1]&[Both TBs failed]

[Rank>1 => Rank>1]&[Both TBs succeeded]

[Rank>1 => Rank>1]&[1TB succeeded and 1 TB failed]

METHOD OF RETRANSMISSION FOR SUPPORTING MIMO IN SYNCHRONOUS HARQ

This application is the National Phase of PCT/KR2010/001624 file on Mar. 16, 2010, which claims priority under 35 U.S.C. 119(e) to U.S. Provisional Application No. 61/160,344 filed on Mar. 16, 2009, U.S. Provisional Application No. 61/181,291 filed on May 27, 2009, U.S. Provisional Application No. 61/224,065 filed on Jul. 9, 2009, U.S. Provisional Application No. 61/252,150 filed on Oct. 15, 2009 and under 35 U.S.C. 119(a) to Patent Application No. 10-2009-0126951 filed in Republic of Korea on Dec. 18, 2009 and Patent Application No. 10-2010-0023223 filed in Republic of Korea on Mar. 16, 2010. The entire contents of all of the above applications are hereby incorporated by reference into the present application.

TECHNICAL FIELD

The present invention relates to a wireless mobile communication system and, more particularly, to a method of retransmission for supporting multi-input multi-output (MIMO) in a synchronous Hybrid Automatic Repeat reQuest (HARQ) considering transmission rank.

BACKGROUND ART

A brief description will be made of a $3^{rd}$ Generation Partnership Project Long Term Evolution (3GPP LTE) communication system as an exemplary mobile communication system to which the present invention is applicable.

FIG. 1 is a diagram illustrating a network configuration of Evolved-Universal Mobile Telecommunications System (E-UMTS) as an example of a mobile communication system.

E-UMTS has evolved from Universal Mobile Telecommunication System (UMTS) and the 3GPP is working on basic standardization of E-UMTS. E-UMTS is also called LTE.

The E-UMTS network may be largely divided into a UMTS Terrestrial Radio Access Network (E-UTRAN) 101 and a Core Network (CN) 102. The E-UTRAN 101 includes a UE 103, an Evolved Node B (eNode B or eNB) 104, and an Access Gateway (AG) which is located at an end of the network and connected to an external network. The AG 105 may be divided into a part for handling user traffic and a part for handling control traffic. An AG for handling new user traffic may communicate with another AG for handling control traffic via a new interface.

An eNode B manages at least one cell. An interface for transmitting user traffic or control traffic may be used between eNode Bs. The CN 102 may include the AG 105 and a node for performing user registration for the UE 103. An interface may also be used to distinguish the E-UTRAN 101 from the CN 102.

A radio interface protocol stack between a UE and a network may include a first layer (L1), a second layer (L2) and a third layer (L3) based on the three lower layers of a well-known Open System Interconnection (OSI) reference model for communication systems. Among the layers, the PHYsical (PHY) layer or L1 provides an information transfer service on physical channels. The Radio Resource Control (RRC) layer in L3 manages radio resources between the UE and the network. For the radio resource management, the RRC layer exchanges RRC messages between the UE and the network. The RRC layer may be distributed to network nodes including the eNode B 104 and the AG 105, or located in either the eNode B 104 or the AG 105.

Following is a brief description of a multi-input multi-output technique.

Conventionally, a single Transmit (Tx) antenna and a single Receive (Rx) antenna are used. Multi-Input Multi-Output (MIMO) uses a plurality of Tx antennas and a plurality of Rx antennas to thereby increase the transmission and reception efficiency of data. That is, the use of multiple antennas at both a transmitter and a receiver may increase capacity and performance in a wireless communication system. Hereinbelow, MIMO may be referred to as 'multi-antenna'.

The multi-antenna technology does not depend on a single antenna path to receive a whole message. Rather, it completes the data by combining data fragments received through a plurality of antennas. With the multi-antenna technology, data rate may be increased within a cell area of a certain size, or system coverage may be extended with a predetermined data rate ensured. Furthermore, this technology may find its use in a wide range including mobile terminals, relays, etc. The multi-antenna technology may overcome transmission capacity problems encountered with the conventional single-antenna technology.

FIG. 2 illustrates the configuration of a typical MIMO communication system. Referring to FIG. 2, a transmitter has NT Tx antennas and a receiver has NR Rx antennas. The use of a plurality of antennas at both the transmitter and the receiver increases a theoretical transmission capacity, compared to the use of a plurality of antennas at only one of the transmitter and the receiver. The channel transmission capacity increases in proportion to the number of antennas. Given a maximum transmission rate Ro in case of a single antenna, the transmission rate may be increased, in theory, to the product of Ro and Ri in case of multiple antennas. Ri is a transmission rate increase rate.

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards for 3rd Generation (3G) mobile communications, future-generation Wireless Local Area Network (WLAN), etc.

There are two types of MIMO schemes: spatial diversity and spatial multiplexing. Spatial diversity increases transmission reliability using symbols that have passed in multiple channel paths, whereas spatial multiplexing increases transmission rate by transmitting a plurality of data symbols simultaneously through a plurality of Tx antennas. The advantages of these two schemes may be taken by using them in an appropriate combination.

To describe a communication scheme in a MIMO system in detail, the following mathematical model may be used. On the assumption of NT Tx antennas and NR Rx antennas as illustrated in FIG. 2, the maximum rank Ri of a channel matrix is given as [Math FIG. 1].

MathFigure 1

$$R_i = \min(N_T, N_R) \quad \quad [\text{Math.1}]$$

Regarding a transmission signal, if $N_T$ Tx antennas are used, up to $N_T$ pieces of information can be transmitted, as expressed as the following vector.

MathFigure 2

$$S = [S_1, S_2, \ldots S_{N_T}]^T \quad \quad [\text{Math.2}]$$

A different transmit power may be applied to each piece of transmission information $S_1, S_2, \ldots, S_{N_T}$.

Let the transmit power levels of the transmission information be denoted by $P_1, P_2, P_{N_T}$, respectively. Then the power-controlled transmission information $\hat{s}$ may be given as [Math FIG. 3].

MathFigure 3

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad [\text{Math.3}]$$

$\hat{s}$ may be expressed as a diagonal matrix P of transmit power.

MathFigure 4

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad [\text{Math. 4}]$$

Meanwhile, actual $N_T$ transmitted signals $$x_1, x_2, \ldots, x_{N_T}$$

may be configured by applying a weight matrix W to the power-controlled information vector $\hat{s}$.

The weight matrix W functions to appropriately distribute the transmission information to the Tx antennas according to transmission channel statuses, etc. These transmitted signals $$x_1, x_2, \ldots, x_{N_T}$$

are represented as a vector x, which may be determined as [Math FIG. 5] below.

MathFigure 5

$$x = \begin{bmatrix} x_1 \\ x_2 \\ \vdots \\ x_i \\ \vdots \\ x_{N_T} \end{bmatrix} \quad [\text{Math. 5}]$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

The signal vector x is represented as follows. Herein, $w_{ij}$ denotes a weight for a $j^{th}$ piece of information $\hat{S}_j$ transmitted through an $i^{th}$ Tx antenna and the weights are expressed as the matrix W. W is referred to as a weight matrix or a precoding matrix.

The afore-mentioned transmitted signal x may be considered in two cases: spatial diversity and spatial multiplexing.

In spatial multiplexing, different signals are multiplexed prior to transmission. Accordingly, the elements of the information vector s have different values. In contrast, the same signal is transmitted in a plurality of channel paths in spatial diversity. As a result, the elements of the information vector s have the same value.

Spatial multiplexing and spatial diversity may be used in combination. For example, the same signal may be transmitted through some Tx antennas in spatial diversity, while different signals may be transmitted through the other Tx antennas in spatial multiplexing.

For $N_R$ Rx antennas, signals received at the Rx antennas, $$y_1, y_2, \ldots, y_{N_R}$$

may be represented as the following vector.

MathFigure 6

$$y=[y_1,y_2,\ldots,y_{N_R}]^T \quad [\text{Math.6}]$$

In the mean time, when channels are modeled in the MIMO communication system, they may be distinguished according to the indexes of Tx and Rx antennas and the channel between a $j^{th}$ Tx antenna and an $i^{th}$ Rx antennas may be represented as $h_{ij}$. It is to be noted herein that the index of the Rx antenna precedes that of the Tx antenna in $h_{ij}$.

The channels may be represented as vectors and a matrix by grouping them. The vector representation of channels may be carried out in the following manner.

FIG. 3 illustrates channels from $N_T$ Tx antennas to an $i^{th}$ Rx antenna.

Referring to FIG. 3, the channels from the $N_T$ Tx antennas to the $i^{th}$ Rx antenna may be expressed as [Math FIG. 7].

MathFigure 7

$$h_i^T=[h_{i1},h_{i2},\ldots,h_{iN_T}] \quad [\text{Math.7}]$$

Also, channels from $N_T$ Tx antennas to $N_R$ Rx antennas may be expressed as the following matrix.

MathFigure 8

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad [\text{Math. 8}]$$

Actual channels experience the above channel matrix H and then are added with Additive White Gaussian Noise (AWGN). The AWGN $$n_1, n_2, \ldots, n_{N_R}$$

added to the $N_R$ Rx antennas is given as the following vector.

MathFigure 9

$$n=[n_1,n_2,\ldots,n_{N_R}]^T \quad [\text{Math.9}]$$

From the above modeled Math Figures, the received signal is

MathFigure 10

$$y = \begin{bmatrix} y_1 \\ y_2 \\ \vdots \\ y_i \\ \vdots \\ y_{N_R} \end{bmatrix} \quad [\text{Math. 10}]$$

$$= \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The above-described MIMO operation is for a single user in the MIMO communication system. When the MIMO communication system operates for multiple users, multi-user diversity may be achieved. Now a description will be made of the multi-user diversity.

A description will be made below of codewords used in the MIMO communication system. A transmitter encodes transmission information using a forward error correction code prior to transmission in order to enable a receiver to correct channel errors in a typical communication system. After demodulating the received signal, the receiver recovers the transmission information by decoding the demodulated signal using the error correction code. In this manner, channel errors of the received signal are corrected during the decoding.

Aside from the error correction, a special coding process is required for error detection. In general, a Cyclic Redundancy Check (CRC) is used as an error detection code.

CRC is one of coding methods for error detection, not for error correction. Typically, the transmitter encodes transmission information with a CRC and then encodes the CRC-coded information with an error correction code. The resulting one coded unit is called "codeword".

The numbers of rows and columns in the channel matrix H representing channel statuses are determined according to the numbers of Tx and Rx antennas. The number of rows is identical to that of the Rx antennas, $N_R$ and the number of columns is identical to that of the Tx antennas, $N_T$. Thus, the channel matrix H is of size $N_R*N_T$.

In general, the rank of a matrix is defined as the minimum of the numbers of independent rows or columns. Accordingly, the rank of the matrix is not larger than the number of rows or columns. For example, the rank of the matrix H, rank(H) is limited as follows.

MathFigure 11

$$\text{rank}(H) \leq \min(N_T, N_R) \quad \text{[Math.11]}$$

If the matrix is eigen value-decomposed, its rank may be defined as the number of non-zero eigen values. Similarly, in case of Singular Value Decomposition (SVD), the rank may be defined as the number of non-zero singular values. Therefore, the rank of a channel matrix physically means the maximum number of different pieces of information that can be transmitted on given channels.

A different piece of information transmitted in MIMO is referred to as 'transmission stream' or shortly 'stream'. The 'stream' may be called 'layer'. It is thus concluded that the number of transmission streams is not larger than the rank of channels, i.e. the maximum number of transmittable different pieces of information.

The channel matrix H is determined by

MathFigure 12

$$\text{\# of streams} \leq \text{rank}(H) \leq \min(N_T, N_R) \quad \text{[Math.12]}$$

"# streams" denotes the number of streams. One thing to be noted herein is that one stream may be transmitted through one or more antennas.

One or more streams may be mapped to a plurality of antennas in various manners. The mapping can be considered as follows according to MIMO types. It can be said that transmission of one stream through a plurality of antennas corresponds to spatial diversity and transmission of a plurality of streams through a plurality of antennas corresponds to spatial multiplexing. Obviously, spatial diversity and spatial multiplexing may be used in a hybrid manner.

A description will be made below of channel coding scheme and HARQ technique.

For reliable transmission, forward error correction (FEC) code is employed. Then, in receiver side, after demodulation, the information is recovered with decoding procedure.

There are many types of channel coding: for example, convolutional code and block code. In this invention, we explain turbo code, so called parallel concatenated convolutional code. A turbo code consists of two recursive systematic convolutional codes connected with a interleaver. Output coded bits consist of systematic and parity bits.

In real communication systems, large size of data block is usually segmented into multiple coding blocks for limitation of implementation. Then, actual channel encoding is done in unit of code block. After encoding, coded bits go through a channel interleaver to combat burst errors.

Finally, to match real transmission resource, a rate matching procedure is done. The rate matching may be separately done for systematic and parity bits. Circular buffer rate matching operates as follows: for a given coding rate, a part of data bits in the circular buffer is transmitted in circular manner.

In case of retransmission, if non overlapped part of data bits is transmitted, we can get coding gain, so called incremental redundancy (IR) gain.

Hybrid automatic repeat request (HARQ) is combination of channel coding and automatic request (ARQ) to improve system throughput. If a receiver decodes a data block successfully, then it sends a acknowledgement (ACK) to the transmitter. Otherwise, it sends negative acknowledgement (NACK) to the transmitter. If the transmitter receives NACK, then the transmitter retransmits the data block. If the transmitter receives ACK, then the transmitter transmits new data if it has data to send.

There are two types of HARQ operation according to retransmission timing. One is asynchronous HARQ and the other is synchronous HARQ. In asynchronous HARQ, retransmission timing is not fixed, which requires indication of whether current transmission is retransmission or not.

On the other hand, synchronous HARQ, retransmission timing is fixed after the initial transmission. For example, if the initial transmission fails, then the retransmission is always occurred at 8 transmission instants after the initial transmission. For another classification, there are also two types of HARQ operation according to redundancy versions. One is chase combining (CC) and the other is IR. In CC type of HARQ, the same data is transmitted at every retransmission, which gives SNR gain. On the other hand, IR type of HARQ, a different redundancy version may be transmitted in retransmission, which gives coding gain.

If we apply HARQ to a system with circular buffer rate matching, IR can be implemented by indicating the starting position of a retransmitted data block. The starting position in the circular buffer for transmission may be defined for each redundancy version (RV).

The aforementioned data block can be processed as described below.

Firstly, CRC is attached to a data block, so called transport block (TB). Multiple ACK/NACK may be sent if multiple TBs are transmitted in a TTI. On the other hand, single ACK/NACK may be sent even if multiple TBs are transmitted in a TTI.

For MIMO system, multiple TB can be transmitted in a transmission time instant, so called TTI. Then, each TB is segmented into multiple code blocks if the size of data block exceeds a threshold value. Each code block is encoded and rate-matched. Then, after concatenation of code block, it goes through a channel interleaver.

After channel interleaving, the data should be mapped to time, frequency, and spatial resource elements. The following is an example of mapping to spatial resource, so called layer.

Table 1 below shows an example of mapping to layer assuming 4 transmit antennas.

TABLE 1

| Transmission rank | Mapping to layer |
|---|---|
| 1 | $s^1(i) = d^1(i)$ |
| 2 | $s^1(i) = d^1(i), s^2(i) = d^2(i)$ |
| 2 | $s^1(i) = d^1(2i) s^2(i) = d^1(2i + 1)$ |
| 3 | $s^1(i) = d^1(i), s^2(i) = d^2(2i) s^3(i) = d^2(2i + 1)$ |
| 4 | $s^1(i) = d^1(2i) s^2(i) = d^1(2i + 1) s^3(i) = d^2(2i) s^4(i) = d^2(2i + 1)$ |

In Table 1, $s^k(i)$ (k=1, 2, 3, 4) is the data mapped to the k-th layer at the i-th index and $d^j(i)$ (j=1, 2) is the data from the j-th TB at the i-th index. In rank 1, single TB is supported and it is mapped to layer 1. In rank 2, 2 TBs are supported and they are mapped to layer 1 and layer 2, respectively. In addition to that, only TB 1 is mapped to layer 1 and layer 2, which may support in retransmission only. In rank 3, 2 TBs are supported, and TB 1 is mapped to layer 1 and TB 2 is mapped to layer 2 and layer 3. In rank 4, 2 TBs are supported, and TB 1 is mapped to layer 1 and layer 2 and TB 2 is mapped to layer 3 and layer 4.

Active studies are underway in many respects regarding the MIMO technology, inclusive of studies of information theory related to calculation of multi-antenna communication capacity in diverse channel environments and multiple access environments, studies of measuring radio channels and deriving a model for a MIMO system, studies of time-space signal processing techniques to increase transmission reliability and transmission rate, etc. Especially, it is necessary to conduct a study of a method for efficiently implementing uplink HARQ retransmission scheme in a MIMO system.

DISCLOSURE OF INVENTION

Technical Problem

An object of the present invention devised to solve the problem lies on a method and apparatus for performing a Hybrid Automatic Repeat reQuest (HARQ) operation for an efficient uplink transmission in a Multiple Input Multiple Output (MIMO) environment.

Another object of the present invention devised to solve the problem lies on a method and apparatus for performing an efficient HARQ operation, taking into account an uplink transmission rank in a MIMO environment.

A further object of the present invention devised to solve the problem lies on a method and apparatus for performing an efficient HARQ operation, when an uplink transmission rank is changed in a MIMO environment.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for performing an HARQ operation at a transmitter in a MIMO system supporting a rank of 2 or higher, including transmitting a plurality of unit data blocks to a receiver, receiving from the receiver a control channel signal including first feedback information indicating whether the transmission of the plurality of unit data blocks is successful, and retransmitting at least one of the plurality of unit data blocks according to a predetermined order, each unit data block in one Transmission Time Interval (TTI), if a rank is 1 and the first feedback information indicates that the transmission of the plurality of unit data blocks is failed.

The first feedback information indicating the failure of the transmission of the plurality of unit data blocks may be a Negative ACKnowledgment (NACK). During the retransmission, a first unit data block among the plurality of unit data blocks may be transmitted to the receiver, and second feedback information indicating whether the retransmission of the first unit data block is successful or failed may be received from the receiver.

The retransmission of a first unit block and the reception of second feedback information may be repeated until the second feedback information is an ACKnowledgment (ACK).

If the second feedback information is an ACK, a second unit data block among the plurality of unit data blocks may be retransmitted to the receiver.

The plurality of unit data blocks may include first and second unit data blocks, and during the retransmission, the first unit data block may be retransmitted to the receiver, and the second unit data block may be retransmitted to the receiver.

The retransmission of the first unit data block and the retransmission of the second unit data block may be repeated until the first unit data block and the second unit data block are both successfully received at the receiver.

The control channel signal may further include a block indicator indicating a unit data block to be retransmitted among the plurality of unit data blocks, and the predetermined order may be determined according to the block indicator.

The block indicator may be included in a predetermined index of a predetermined Modulation and Coding Scheme (MCS) table.

The control channel signal may further include a new data indicator for each of the plurality of unit data blocks, indicating whether new data is to be transmitted in the unit data block, and during the retransmission, a unit data block for which a new data indicator is not toggled among the plurality of unit data blocks may be retransmitted.

The plurality of unit data blocks may include a first unit data block and a second unit data block, and during the retransmission, the first unit data block may be retransmitted to the receiver in a predetermined TTI, and the second unit data block may be retransmitted to the receiver in a subframe following the predetermined TTI.

In another aspect of the present invention, provided herein is a User Equipment (UE) for supporting a rank of 2 or higher, including a processor, and a Radio Frequency (RF) module for supporting a plurality of antennas and transmitting and receiving radio signals to and from an external device under control of the processor. The processor controls a plurality of unit data blocks to be transmitted to a Base Station (BS), controls first feedback information indicating whether the transmission of the plurality of unit data blocks is successful to be acquired from a control channel signal by receiving the control channel signal from the BS, and controls at least one of the plurality of unit data blocks to be retransmitted according to a predetermined order, each unit data block in one TTI, if a rank is 1 and the first feedback information indicates that the transmission of the plurality of unit data blocks is failed.

The first feedback information indicating the failure of the transmission of the plurality of unit data blocks may be a NACK, and the processor may control a first unit data block among the plurality of unit data blocks to the BS to be retransmitted, until second feedback information indicating that the retransmission of the first unit data block is successful is received from the BS.

The processor may control a second unit data block among the plurality of unit data blocks to be retransmitted to the BS, if the second feedback information indicating that the retransmission of the first unit data block is successful is received.

The plurality of unit data blocks may include first and second unit data blocks, and the processor may control the first unit data block and the second unit data block to be sequentially retransmitted to the BS until the BS successfully receives both of the first and second unit data blocks.

The control channel signal may further include a block indicator indicating a unit data block to be retransmitted among the plurality of unit data blocks, and the processor may determine the predetermined order according to the block indicator.

The block indicator may be included in a predetermined index of a predetermined MCS table.

The control channel signal may further include a new data indicator for each of the plurality of unit data blocks, indicating whether new data is to be transmitted in the unit data block, and the processor may control a unit data block for which a new data indicator is not toggled among the plurality of unit data blocks to be retransmitted.

The plurality of unit data blocks may include a first unit data block and a second unit data block, and the processor may control the first unit data block to be retransmitted to the BS in a predetermined TTI and controls the second unit data block to be retransmitted to the BS in a subframe following the predetermined TTI.

The control channel signal may be a Physical Downlink Control CHannel (PDCCH) signal.

Advantageous Effects of Invention

The exemplary embodiments of the present invention have the following effects.

An uplink transmission can be efficiently performed in a MIMO environment.

An HARQ operation can be efficiently performed, taking into account an uplink transmission rank in a MIMO environment.

When an uplink transmission rank is changed in a MIMO environment, an HARQ operation can be efficiently performed according to a preset order, an ACKnowledgment/Negative ACKnowledgment (ACK/NACK) transmitted on a control channel, and/or a New Data Indicator (NDI) set for each Transmission Block (TB).

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
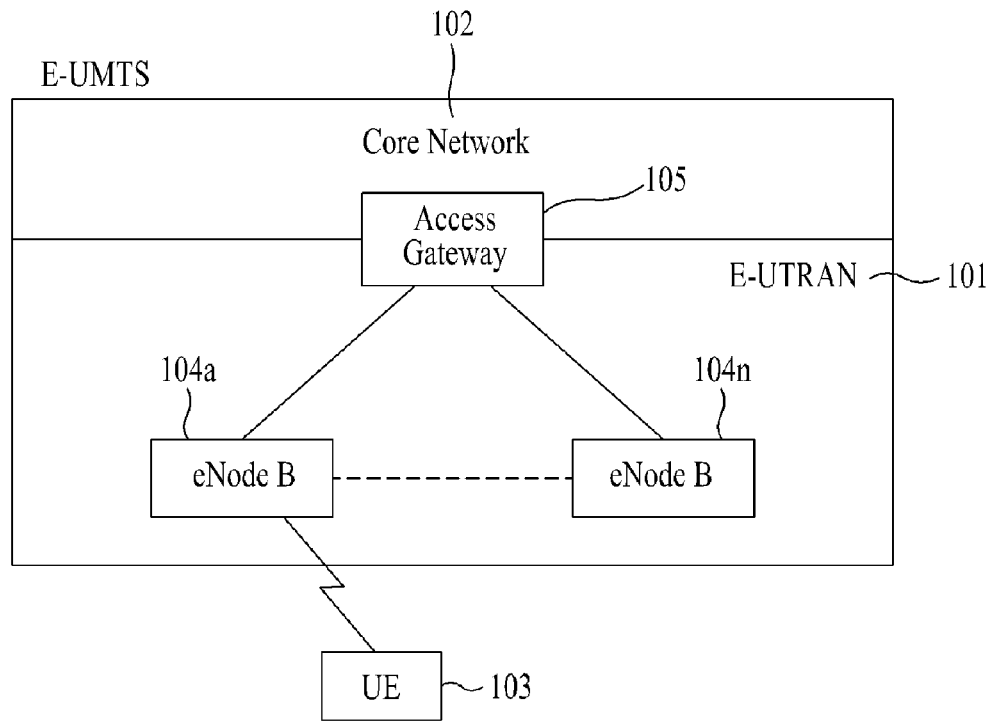
FIG. 1 illustrates the configuration of an Evolved-Universal Mobile Telecommunications System (E-UMTS) network as an example of a mobile communication system.
Figure 2:
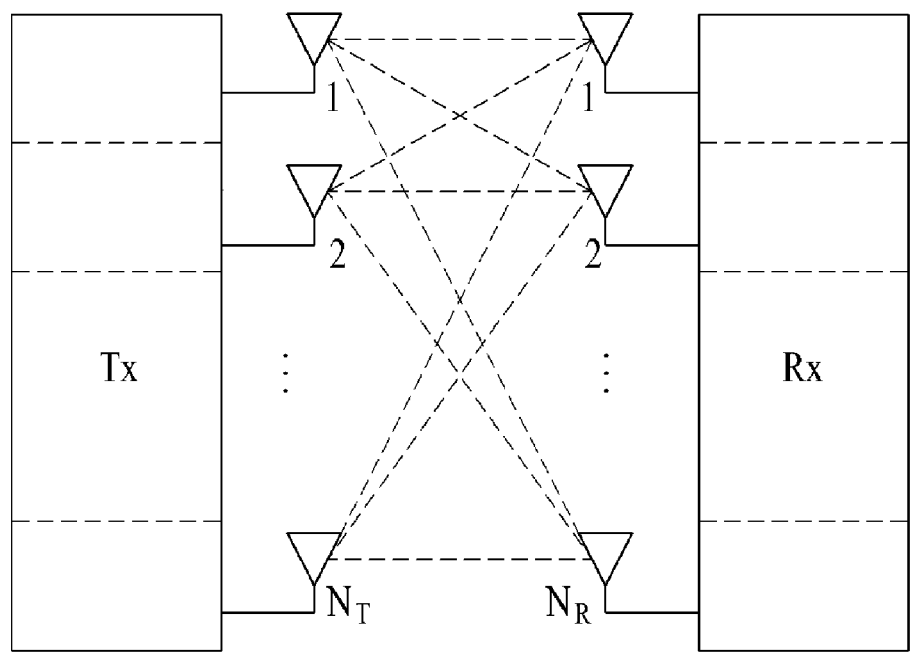
FIG. 2 illustrates the configuration of a typical Multiple Input Multiple Output (MIMO) communication system.
Figure 3:
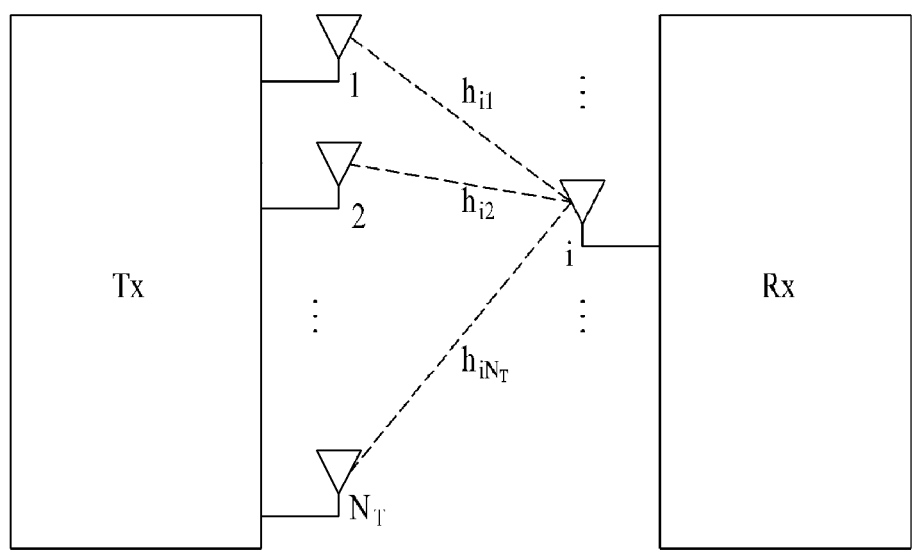
FIG. 3 illustrates channels from $N_T$ Transmission (Tx) antennas to an $i^{th}$ Reception (Rx) antenna.
Figure 4:
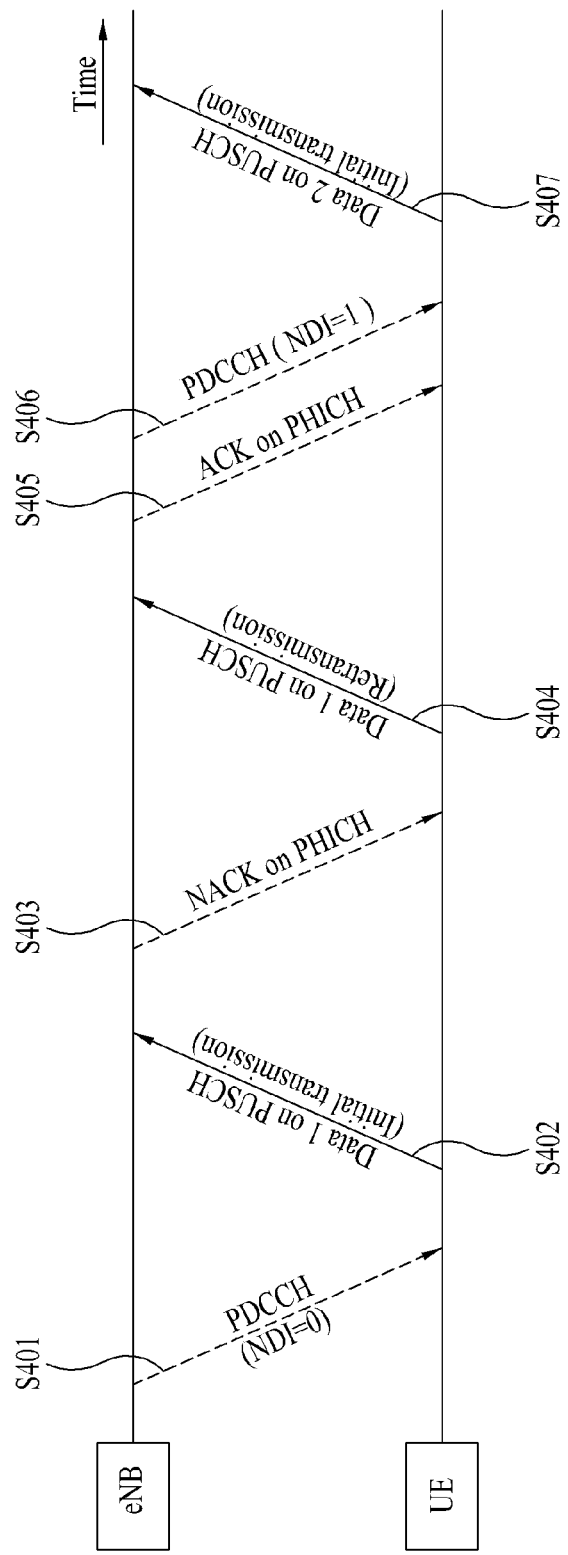
FIG. 4 illustrates a Hybrid Automatic Repeat reQuest (HARQ) operation in a Long Term Evolution (LTE) system.

Now, the above and other aspects of the present invention will be described in detail through preferred embodiments with reference to the accompanying drawings so that the present invention can be easily understood and realized by those skilled in the art. The detailed description is intended to explain exemplary embodiments of the present invention, rather than to show the only embodiments that can be implemented according to the invention. While the following description includes specific details to help comprehensive understanding of the present invention, it is clear to those skilled in the art that the present invention can be implemented without the specific details. For example, while the following description is made in the context of a 3rd Generation partnership Project Long Term Evolution (3GPP LTE) system as a mobile communication system, it is applicable to other mobile communication systems except for specifics inherent to 3GPP LTE.

In some cases, known structures and devices are omitted or illustrated in block diagrams, focusing on main functions of each structure and device, so as not to obscure the concept of the present invention. Wherever possible, the same reference numbers will be used throughout this specification to refer to the same or like components.

Herein, the term 'User Equipment (UE)' refers to a mobile or fixed user terminal such as a terminal, a Mobile Station (MS), or the like. Also, the term 'BS' refers to a terminal node of a network, which communicates with the UE.

While the above-described HARQ operation method was designed on the premise of a single-antenna situation, HARQ operations according to the present invention are intended to take place in a Multiple Input Multiple Output (MIMO) system that supports a plurality of Transmission Blocks (TBs).

A description will be made of methods for performing an HARQ operation, taking into account an ACK/NACK and an NDI according to the present invention.

Embodiment 1

An exemplary embodiment of the present invention is implemented on the assumption that a MIMO system supports a plurality of TBs (two TBs herein, for the convenience' sake) and supports a single ACK/NACK irrespective of the number of TBs (ACK/NACK bundling).

A receiver transmits one ACK/NACK for two TBs to a transmitter. Therefore, if an error occurs to at least one of the TBs, both the TBs should be retransmitted. An NDI is a 1-bit indicator indicating one of two states, that is, whether a current transmission is an initial transmission or a retransmission.

If the two TBs are initially transmitted with rank 2 or a higher rank and the rank is changed to rank 1 at a retransmission, the TBs cannot be transmitted simultaneously, each with rank 1 in case of the layer mapping illustrated in [Table 1]. The same problem may be encountered with a system supporting an ACK/NACK for each of two transmitted TBs, when NACKs are generated for the two TBs and the transmission rank is decreased to rank 1.

To overcome the problem, the following methods are proposed in the exemplary embodiment of the present invention.

One of the methods is to restrict the rank of a retransmission.

Specifically, even though the status of transmission channels gets so poor that the transmission rank is decreased to 1, a retransmission is performed with rank 2 or a higher rank. Although it is preferred to retransmit data with rank 1 in this situation, a retransmission of the data with rank 2 or a higher rank may not bring about significant performance degradation because of an HARQ combining gain. Accordingly, when an initial transmission is performed with rank 2 or a higher rank, a retransmission preferably has a rank higher than 1 all the time, irrespective of channel status in this method.

Another method is to transmit two or more TBs with rank 1.

Specifically, each TB is transmitted in a different group of symbols (e.g. Orthogonal Frequency Division Multiplexing (OFDM) or Single Carrier-Frequency Division Multiple Access (SC-FDMA) symbols). For example, a first TB (TB1) and a second TB (TB2) are rate-matched according to the numbers of layers for their initial transmissions. In other words, if TB1 is initially transmitted in one layer and TB2 is initially transmitted in two layers, the size of the rate-matched information of TB2 is about twice larger than the size of the rate-matched information of TB1. Alternatively, TB1 and TB2 may be rate-matched to the same size.

In either case, the rate-matched information of TB1 and TB2 may be transmitted, sharing one layer.

In an example of multiplexing rate-matched information of different TBs in one layer, the rate-matched information of the TBs may alternate in SC-FDMA symbols except symbols carrying Reference Signals (RSs).

In another example, the rate-matched information of TB1 may be transmitted in one half of a subframe, and the rate-matched information of TB2 may be transmitted in the other half of the subframe.

A third method is to modify synchronous HARQ.

Since retransmission timings are generally fixed in a synchronous HARQ operation, data which has not been successfully decoded is retransmitted at a preset next transmission time instant. On the afore-described assumption that a single ACK/NACK is transmitted for two TBs, if a NACK is issued for initially transmitted two TBs, the transmitter has no way to identify a TB having an error and thus it should retransmit both the TBs. If both the TBs cannot be retransmitted at one time in view of a retransmission rank such as rank 1, only one of the TBs is retransmitted. Further, the present embodiment is described on the assumption that the ACK/NACK bundling is applied for 2TBs. However, the present embodiment can be also applied to a system supporting an ACK/NACK for each of two transmitted TBs, when NACKs are generated for the two TBs and the transmission rank is decreased to rank 1.

In this case, only one TB is transmitted during one Transmission Time Interval (TTI) and thus successful or failed decoding of the transmitted TB may be indicated by one ACK/NACK. The same thing may apply to an NDI. That is, it may be indicated with an NDI associated with a TB whether the TB is to be retransmitted.

The receiver cannot identify the retransmitted TB. Hence, it is necessary to preset the retransmission order of the two TBs. Two retransmission orders are considered according to this method.

One of the retransmission orders is set in such a manner that one TB is retransmitted repeatedly until the receiver successfully receives the TB, and the other retransmission order is set so that the TBs are alternately retransmitted.

The first retransmission order will be described with reference to [Table 2] below.

TABLE 2

| Retransmission time instant | 1 | 2 | 3 | 4 | 5 |
|---|---|---|---|---|---|
| TB number | TB 1 | TB 1 | TB 1 | TB 2 | TB 2 |
| Result of decoding | NACK | NACK | ACK | NACK | ACK |

Referring to [Table 2], TB1 is retransmitted at a first retransmission time instant and the retransmission of TB1 is repeated until an ACK is issued for TB1 at a third retransmission time instant. Subsequently, TB2 is retransmitted at a fourth retransmission time instant.

The second retransmission order will be described with reference to [Table 3] below.

TABLE 3

| Retransmission time instant | 1 | 2 | 3 | 4 | 5 |
|---|---|---|---|---|---|
| TB number | TB 1 | TB 2 | TB 1 | TB 2 | TB 2 |
| Result of decoding | NACK | NACK | ACK | NACK | ACK |

Referring to [Table 3], retransmissions of TB1 and TB2 alternate with each other. When one of the two TBs is successfully retransmitted, only the other TB is retransmitted, starting at the next retransmission time instant. Alternatively, even though one of the TBs is successfully retransmitted, the two TBs may be retransmitted alternately in order to prevent an error such as ACK-to-NACK misinterpretation or the like, as illustrated in [Table 4].

TABLE 4

| Retransmission time instant | 1 | 2 | 3 | 4 | 5 |
|---|---|---|---|---|---|
| TB number | TB 1 | TB 2 | TB 1 | TB 2 | TB 1 |
| Result of decoding | ACK | NACK | ACK | NACK | ACK |

Referring to [Table 4], despite an ACK generated for TB1 after a first retransmission, the retransmission of TB1 continues due to TB2 for which a NACK is issued.

According to another aspect of the third method, an ACK/NACK is issued in the same manner and 1) a TB indicator is additionally transmitted to indicate a TB to be transmitted during a TTI or 2) an NDI is independently used for each TB, in order to make a more accurate decision as to retransmission.

These two methods may be used selectively or in combination, along with the above-described retransmission orders.

For example, an NDI may be independently used for each TB according to the first or second retransmission order. In another example, one NDI and one TB indicator are used according to the first or second retransmission order.

A fourth method is to make another modification to synchronous HARQ.

Specifically, each TB is transmitted in one layer and particularly, all TBs are retransmitted in consecutive subframes.

For example, when TB1 and TB2 are initially transmitted with rank 3 and the receiver fails to decode them, the transmitter retransmits TB1 during the next TTI and then retransmits TB2 in a subframe following a subframe carrying the retransmission TB1. This method may affect an HARQ process (e.g. a new data transmission) related to the subframe carrying the TB (herein, TB2) following the first retransmitted TB (herein, TB1). To avert this problem, the transmitter may schedule a new transmission for a corresponding TTI for the receiver, only when there is no need for retransmitting a TB in a subframe following the next TTI. This will be described with reference to FIGS. 5 and 6.

Figure 5:
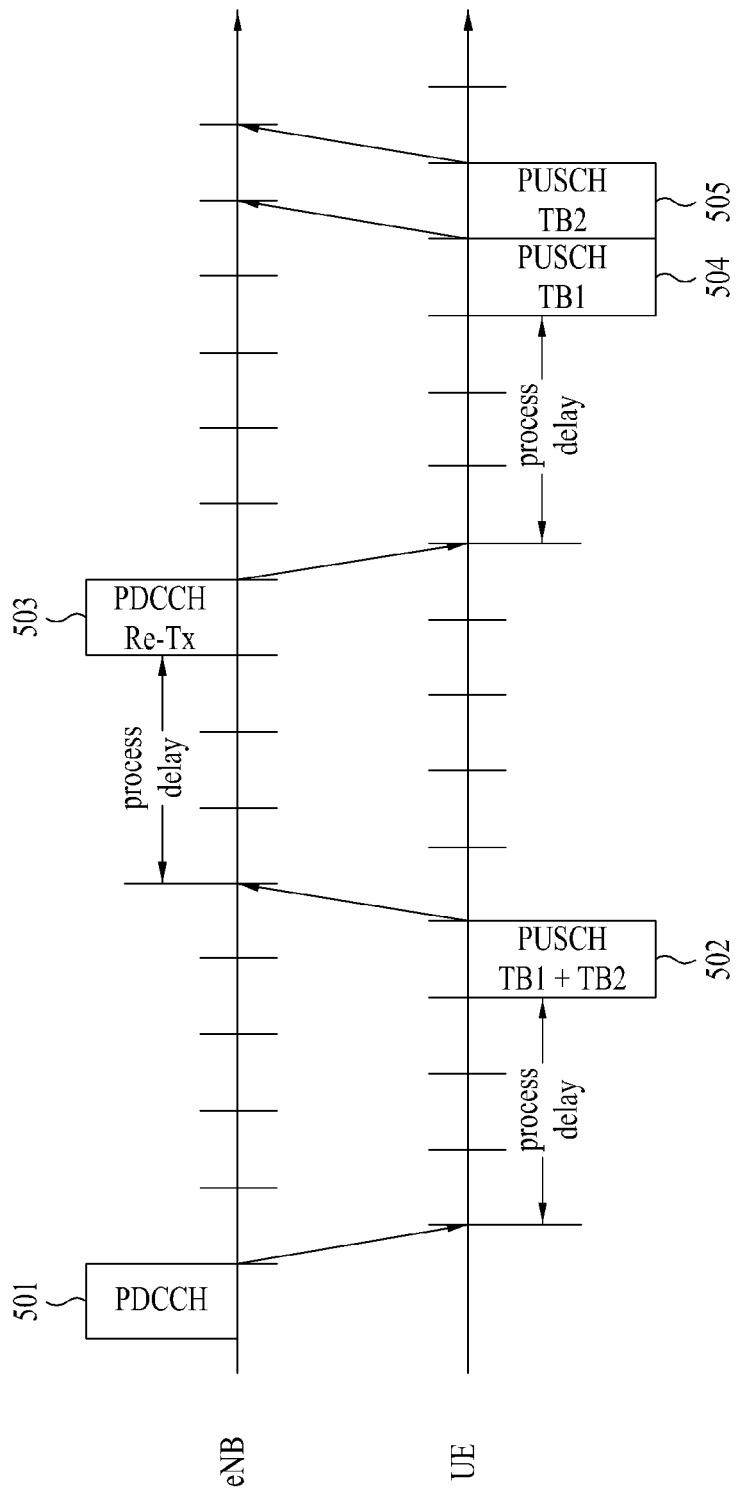
FIGS. 5 and 6 illustrate HARQ operation methods according to exemplary embodiments of the present invention.
Figure 6:
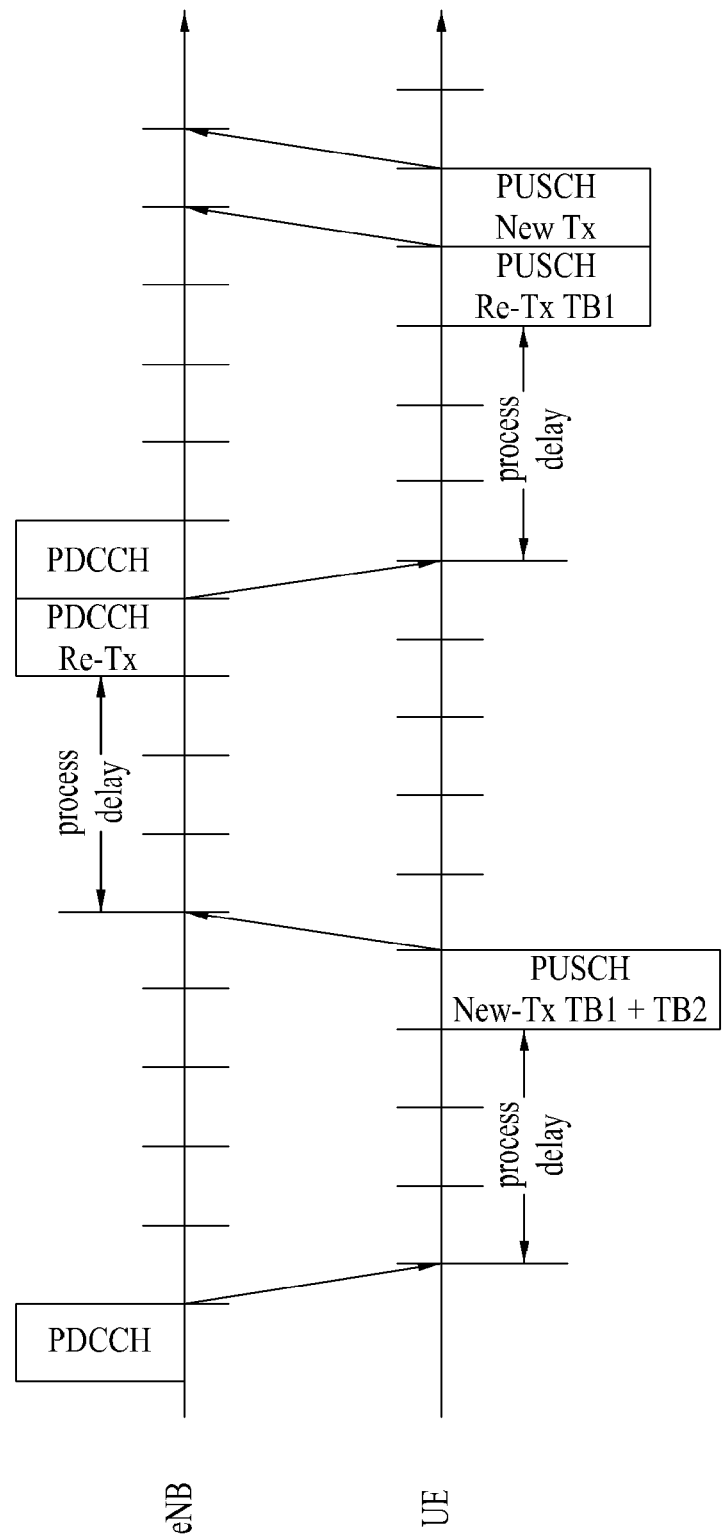

FIGS. 5 and 6 illustrate HARQ operation methods according to exemplary embodiments of the present invention.

In FIGS. 5 and 6, an eNB serves as a receiver and a UE serves as a transmitter.

Referring to FIG. 5, the UE simultaneously transmits TB1 and TB2 with rank 2 to the eNB on a PUSCH 502 according to PDCCH scheduling 501 of the eNB.

When a decoding error occurs to at least one of TB1 and TB2, the eNB schedules a retransmission via a PDCCH 503, along with a NACK due to the decoding error.

As the channel status between the UE and the eNB gets so poor that rank 1 is to be used, the UE may retransmit TB1 on a PUSCH during the TTI following the initial transmission and TB2 in the subframe following the TTI.

Meanwhile, the eNB may add a 1-bit indicator or its equivalent information indicating a TB to be retransmitted. Thus, only one TB may be retransmitted and the retransmission order may be dynamically adjusted.

As illustrated in FIG. 6, if only TB1 has a decoding error during the initial transmission, the eNB may command the UE to retransmit TB1 only, while scheduling new data transmission for the subframe following the next TTI to the initial transmission.

Embodiment 2

In another exemplary embodiment of the present invention, methods for performing an HARQ operation using a modification of typical Downlink Control Information (DCI) format 0 are provided.

A standard LTE technology (e.g. LTE Release 8) does not support uplink MIMO. In this context, an uplink MIMO scheme supporting rank 2 of a higher rank during one TTI according to the present invention may not be implemented with the conventional DCI format 0.

DCI format 0 may be modified in two methods: one is to use as many NDIs as the number of TBs along with a single ACK/NACK, if a plurality of TBs are transmitted during one TTI, and the other is to introduce a new Modulation and Coding Scheme (MCS) table.

1) Method for Using as Many NDIs as the Number of TBs

On the assumption that up to two TBs are transmitted during one TTI (e.g. in one subframe), one NDI is added to a PDCCH so that one NDI is used for each TB.

As described before, an NDI indicates whether a current transmission is a new data transmission. If a current NDI is toggled from the previous NDI, the transmitter (e.g. a UE) flushes an HARQ buffer corresponding to an associated HARQ process and transmits new data. On the other hand, if the current NDI is identical to the previous NDI, the transmitter retransmits data.

This method is performed in the following three scenarios.

I) Rank Increases from 1 to a Higher Rank.

When the transmission rank increases from rank 1 to rank 2 or a higher rank, a new NDI may be set irrespective of whether data transmitted with rank 1 is to be retransmitted, which will be described with reference to FIG. 7.

Figure 7:
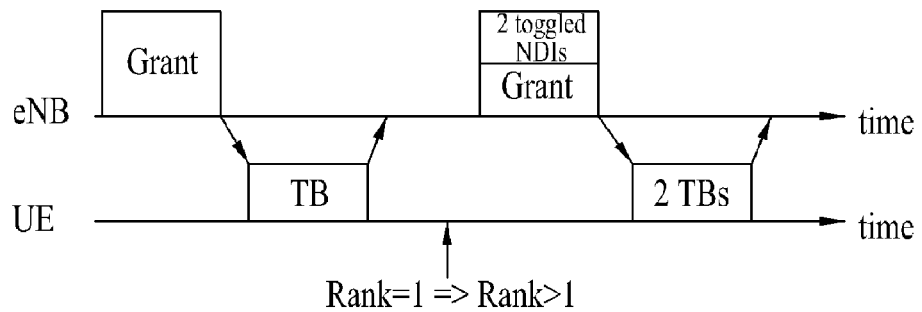
FIG. 7 illustrates an HARQ operation method according to another exemplary embodiment of the present invention.

FIG. 7 illustrates an HARQ operation method according to another exemplary embodiment of the present invention.

Referring to FIG. 7, it may occur that one TB is initially transmitted with rank 1, the receiver (herein, the eNB) receives the TB successfully without any decoding error, and the transmission rank is changed to rank 2 or a higher rank. Accordingly, the receiver transmits a PDCCH with two toggled NDIs to the transmitter (herein, the UE). Because both the NDIs are toggled, the transmitter may transmit new data in each TB to the receiver.

If the initial transmission is failed, the receiver may notify the transmitter of the failure by maintaining the NDI corresponding to the initially transmitted TB at the same value. Due to the use of the two NDIs, the transmission success or failure of the individual TBs may be indicated in spite of a single ACK/NACK for them. To be more specific, even though the receiver fails to decode one of a plurality of TBs and transmits a NACK for the TBs, new data can be transmitted in successfully decoded TBs despite the NACK. The following exemplary embodiments commonly have this advantage.

II) Rank Increases from a Higher Rank to Rank 1.

Figure 8:
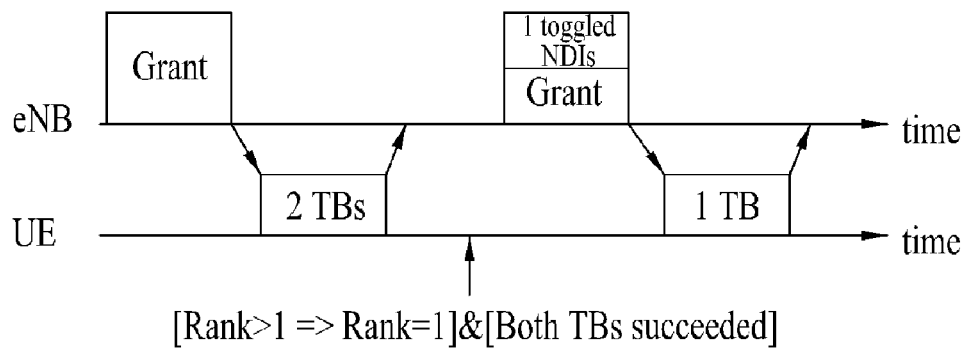
FIG. 8 illustrates an HARQ operation method according to another exemplary embodiment of the present invention.

The case that the transmission rank decreases from a higher rank to rank 1 may be further branched into three scenarios.

a) When two previously transmitted TBs are all successfully received, an HARQ operation is performed in the manner illustrated in FIG. 8.

FIG. 8 illustrates an HARQ operation method according to another exemplary embodiment of the present invention.

Figure 9:
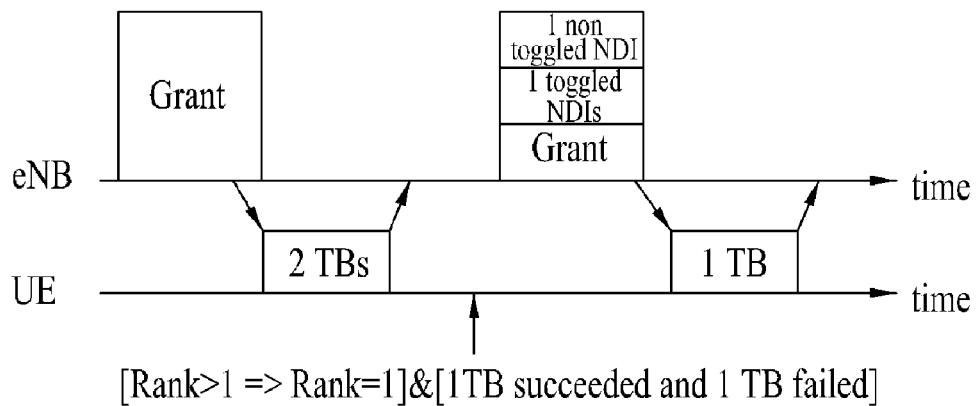
FIG. 9 illustrates an HARQ operation method according to another exemplary embodiment of the present invention.

Referring to FIG. 8, if the transmitter succeeds in initial transmission of two TBs and the transmission rank decreases to rank 1, the receiver transmits one toggled NDI to the transmitter. Accordingly, the transmitter transmits one new TB to the receiver.

b) When only one of two initially transmitted TBs is successful, an HARQ operation is performed in the manner illustrated in FIG. 9.

FIG. 9 illustrates an HARQ operation method according to another exemplary embodiment of the present invention.

Figure 10:
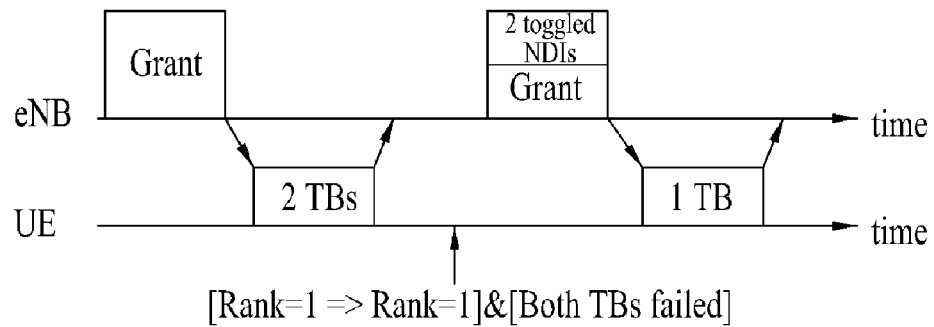
FIG. 10 illustrates an HARQ operation method according to another exemplary embodiment of the present invention.

Referring to FIG. 9, when only one of the TBs is successful in initial transmission, the receiver toggles an NDI associated with the successful TB, keeps an NDI associated with the failed TB at the same value, and transmits the NDIs to the transmitter. Thus the transmitter may retransmit only the TB for which the NDI has not been toggled.

c) When either of two TBs is not successful in initial transmission, an HARQ operation is performed in the manner illustrated in FIG. 10.

FIG. 10 illustrates an HARQ operation method according to another exemplary embodiment of the present invention.

Referring to FIG. 10, if both the TBs are failed in the initial transmission and the transmission rank decreases to rank 1, the receiver transmits two non-toggled NDIs for the TBs to the transmitter. Because of the decreased rank, rank 1, the transmitter may retransmit only one TB.

In this case, in order to indicate a TB to be retransmitted, a 1-bit TB indicator may be used. Or a retransmission order may be preset as described before with reference to [Table 1] to [Table 4] in relation to the first exemplary embodiment of the present invention.

III) Rank is Kept to be Higher than Rank 1

Figure 11:
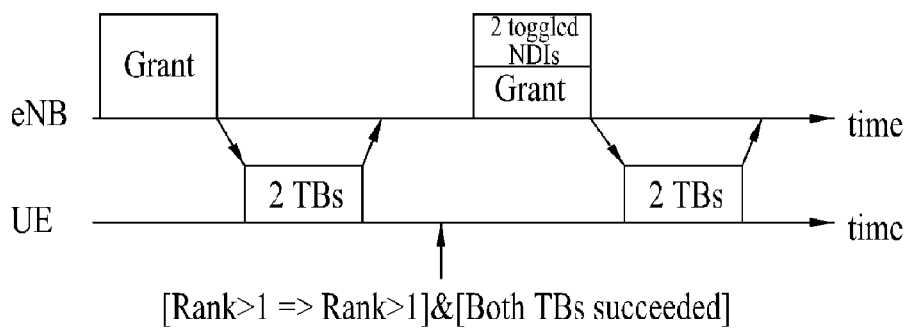
FIG. 11 illustrates an HARQ operation method according to another exemplary embodiment of the present invention.

When the transmission rank is maintained to be higher than rank 1, the following three scenarios may be considered.

a) When two previously transmitted TBs are all successfully received, an HARQ operation is performed in the manner illustrated in FIG. 11.

FIG. 11 illustrates an HARQ operation method according to another exemplary embodiment of the present invention.

Figure 12:
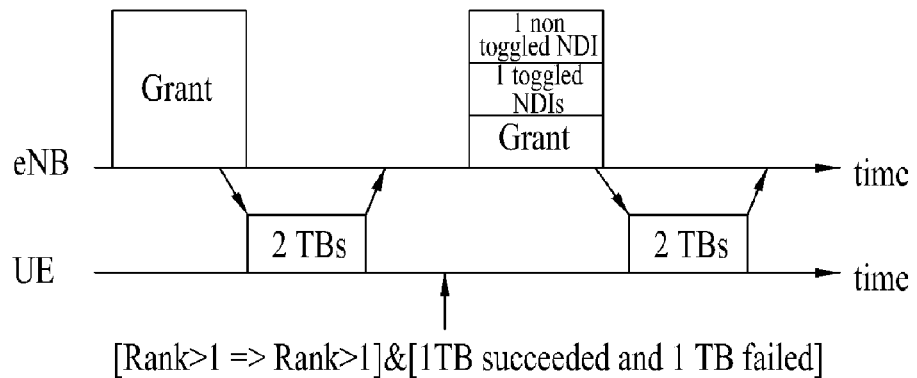
FIG. 12 illustrates an HARQ operation method according to another exemplary embodiment of the present invention.

Referring to FIG. 11, since rank 2 is maintained, two TBs may be transmitted at the next transmission time instant. If the transmitter succeeds in initial transmission of two TBs, the receiver transmits two toggled NDIs to the transmitter. Accordingly, the transmitter transmits two new TBs to the receiver.

b) When only one of two initially transmitted TBs is successful, an HARQ operation is performed in the manner illustrated in FIG. 12.

FIG. 12 illustrates an HARQ operation method according to another exemplary embodiment of the present invention.

Figure 13:
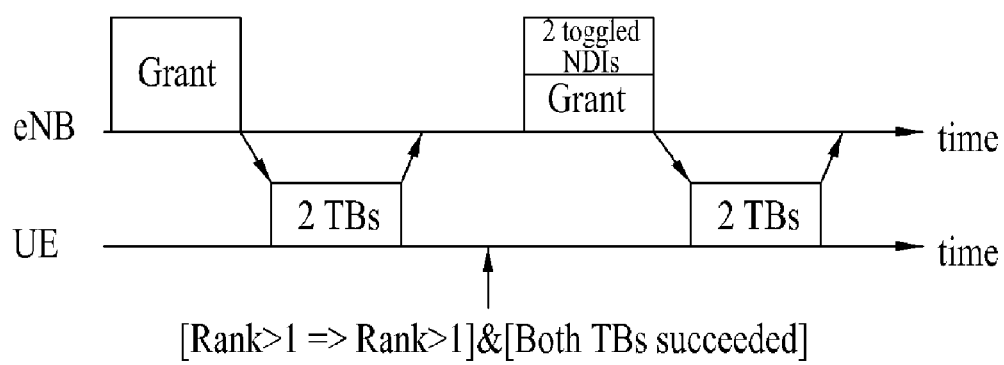
FIG. 13 illustrates an HARQ operation method according to a further exemplary embodiment of the present invention.

Referring to FIG. 12, when only one of the TBs is successful in initial transmission, the receiver toggles an NDI associated with the successful TB, keeps an NDI associated with the failed TB at the same value, and transmits the NDIs to the transmitter. Thus the transmitter may retransmit a new TB for which the NDI has been toggled and retransmits the TB for which the NDI has not been toggled.

b-1) When only one of two previously transmitted TBs is successful and the receiver needs only one TB, the NDIs are set in the same manner illustrated in FIG. 10. The transmitter may flush an HARQ buffer corresponding to an HARQ process associated with the toggled NDI and retransmit the TB for which the NDI has not been toggled. The transmission of one TB may be indicated by transmitting a UL grant on a PDCCH.

c) When both TBs are failed in initial transmission, an HARQ operation is performed in the manner illustrated in FIG. 13.

FIG. 13 illustrates an HARQ operation method according to another exemplary embodiment of the present invention.

Referring to FIG. 13, if either of the two TBs is not successful in the initial transmission, the receiver transmits two non-toggled NDIs for the TBs to the transmitter. Thus the transmitter retransmits the two TBs.

While a modification to DCI format 0 has been described above in terms of transmission rank, the modification may be considered from the perspective of codeword. Thus HARQ operations illustrated in FIGS. 7 to 13 for the cases of rank increase, decrease, and maintenance may be performed in the cases of codeword increase, decrease, and maintenance.

2) New MCS Table

According to another aspect of the exemplary embodiment, a new MCS table is provided to support transmission of a plurality of TBs.

A typical MCS table is extended to two TBs, by way of example, as illustrated in [Table 5] below.

TABLE 5

| MCS index for TB1 | RV indication | MCS index for TB2 | RV indication |
|---|---|---|---|
| 0 | 0 | 0 | 0 |
| 1 |   | 1 |   |
| 2 |   | 2 |   |
| 27 |   | 27 |   |
| 28 |   | 28 |   |
| 29 | 1 | 29 | 1 |
| 30 | 2 | 30 | 2 |
| 31 | 3 | 31 | 3 |

Referring to [Table 5], an MCS table for supporting a plurality of TBs may be made up by using the typical MCS table for each TB. For this purpose, an NDI is preferably used on a TB basis. Since an NDI corresponding to a TB indicates whether the TB is to be retransmitted, an MCS may be selected independently on a TB basis.

For example, TB1 and TB2 are initially transmitted according to their MCS indexes each ranging from 0 to 28, and RV0. It is assumed that one of the TBs, for instance, TB1 is not successfully decoded at the receiver and the other TB, for instance TB2 is successfully transmitted. The following two cases may be considered according to MCS index selection.

i) If one of the MCS indexes 0 to 28 is selected, TB1 is retransmitted according to RV0 and the selected MCS index and TB2 carries new data according to RV0 and the selected MCS index.

ii) If one of MCS indexes 29, 30 and 31 is selected for TB1 and one of the MCS indexes 0 to 28 is selected for TB2, TB1 is retransmitted according to an RV value corresponding to the selected MCS index and the MCS index used for the initial transmission, whereas TB2 is transmitted according to RV0 and the selected MCS index.

If the initial transmission of both TBs is all failed, each of the TBs is retransmitted in the manner applied to TB1 in the above example.

As another example of modifying an MCS table, a second MCS index is used as a TB indicator, as illustrated in [Table 6].

TABLE 6

| MCS index 1 | RV indication | MCS index 2 | TB indication |
|---|---|---|---|
| 0 | 0 | 0 | TB1 and TB2 |
| 1 |   | 1 |   |
| 2 |   | 2 |   |
| 27 |   | 27 |   |
| 28 |   | 28 |   |
| 29 | 1 | 29 | TB1 |
| 30 | 2 | 30 | TB2 |
| 31 | 3 | 31 | TB1 and TB2 |

Referring to [Table 6], one of two MCS indexes is used for a general purpose, and the other MCS index is used as a TB indicator. Specifically, when TB1 and TB2 are transmitted with rank 2 simultaneously at an initial transmission, MCS index 1 indicates an MCS index ranging from 0 to 28 for TB1 and MCS index 2 indicates an MCS index ranging from 0 to 28 for TB2. If the transmission rank is changed to rank 1 at the next transmission, MCS index 2 ranging from 29 to 31 may be used to indicate a TB to be retransmitted.

For instance, it is assumed that both initially transmitted TB1 and TB2 are failed and the transmission rank is changed to rank 1. If the scheduler of the receiver commands a retransmission of TB1, MCS index 1 may indicate an RV for TB1, if MCS index 1 is selected to be one of 29, 30 and 31, whereas MCS index 1 may indicate an MCS level for TB1 to be retransmitted (herein, RV=0), if MCS index 1 is selected from among 0 to 28. In addition, 29 is selected as MCS index 2 to indicate that TB1 is currently retransmitted. If TB2 is retransmitted, MCS index 1 indicates an RV and an MCS index and MCS index 2 is set to 30 to indicate retransmission of TB2, similarly to the retransmission of TB1.

3) Modification of Codebook Index

According to a further aspect of the exemplary embodiment, a method of indicating a retransmitted TB by using a new codebook index table considering the number of Tx antennas is provided.

In this method, when two TBs are failed in their initial transmission, the TB to transmit for the next transmission (i.e. retransmission) is indicated with Codebook Index as shown in [Table 7]

[Table 7] illustrates an exemplary new codebook table according to a further aspect of the exemplary embodiment.

TABLE 7

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | |
| 5 | $\frac{1}{\sqrt{2}}\begin{bmatrix}0\\1\end{bmatrix}$ | |

Referring to [Table 7], in a case where two TBs are initially transmitted, codebook index 0 of layer2 can be used. If the transmission rank is reduced to rank1, a TB to be retransmitted can be indicated by using either codebook index 4 (for retransmission of TB1) or codebook index 5 (for retransmission of TB2).

[Table 8] illustrates an exemplary new codebook table for rank 1 and [Table 9] illustrates an exemplary new codebook table for rank 2, in a system supporting 4 Tx antennas according to a further aspect of the exemplary embodiment, respectively.

TABLE 8

Index 0 to 7:
$\frac{1}{2}\begin{bmatrix}1\\1\\1\\-1\end{bmatrix}$
$\frac{1}{2}\begin{bmatrix}1\\1\\j\\j\end{bmatrix}$
$\frac{1}{2}\begin{bmatrix}1\\1\\-1\\1\end{bmatrix}$
$\frac{1}{2}\begin{bmatrix}1\\1\\-j\\-j\end{bmatrix}$
$\frac{1}{2}\begin{bmatrix}1\\j\\1\\j\end{bmatrix}$
$\frac{1}{2}\begin{bmatrix}1\\j\\j\\1\end{bmatrix}$
$\frac{1}{2}\begin{bmatrix}1\\j\\-1\\-j\end{bmatrix}$
$\frac{1}{2}\begin{bmatrix}1\\j\\-j\\-1\end{bmatrix}$ Index 8 to 15:
$\frac{1}{2}\begin{bmatrix}1\\-1\\1\\1\end{bmatrix}$
$\frac{1}{2}\begin{bmatrix}1\\-1\\j\\-j\end{bmatrix}$
$\frac{1}{2}\begin{bmatrix}1\\-1\\-1\\-1\end{bmatrix}$
$\frac{1}{2}\begin{bmatrix}1\\-1\\-j\\j\end{bmatrix}$
$\frac{1}{2}\begin{bmatrix}1\\-j\\1\\-j\end{bmatrix}$
$\frac{1}{2}\begin{bmatrix}1\\-j\\j\\-1\end{bmatrix}$
$\frac{1}{2}\begin{bmatrix}1\\-j\\-1\\j\end{bmatrix}$
$\frac{1}{2}\begin{bmatrix}1\\-j\\-j\\1\end{bmatrix}$ Index 16 to 23:
$\frac{1}{2}\begin{bmatrix}1\\0\\1\\0\end{bmatrix}$
$\frac{1}{2}\begin{bmatrix}1\\0\\-1\\0\end{bmatrix}$
$\frac{1}{2}\begin{bmatrix}1\\0\\j\\0\end{bmatrix}$
$\frac{1}{2}\begin{bmatrix}1\\0\\-j\\0\end{bmatrix}$
$\frac{1}{2}\begin{bmatrix}0\\1\\0\\1\end{bmatrix}$
$\frac{1}{2}\begin{bmatrix}0\\1\\0\\-1\end{bmatrix}$
$\frac{1}{2}\begin{bmatrix}0\\1\\0\\j\end{bmatrix}$
$\frac{1}{2}\begin{bmatrix}0\\1\\0\\-j\end{bmatrix}$

TABLE 9

Index 0 to 7:
$\frac{1}{2}\begin{bmatrix}1 & 0\\1 & 0\\0 & 1\\0 & -j\end{bmatrix}$
$\frac{1}{2}\begin{bmatrix}1 & 0\\1 & 0\\0 & 1\\0 & j\end{bmatrix}$
$\frac{1}{2}\begin{bmatrix}1 & 0\\-j & 0\\0 & 1\\0 & 1\end{bmatrix}$
$\frac{1}{2}\begin{bmatrix}1 & 0\\-j & 0\\0 & 1\\0 & -1\end{bmatrix}$
$\frac{1}{2}\begin{bmatrix}1 & 0\\-1 & 0\\0 & 1\\0 & -j\end{bmatrix}$
$\frac{1}{2}\begin{bmatrix}1 & 0\\-1 & 0\\0 & 1\\0 & j\end{bmatrix}$
$\frac{1}{2}\begin{bmatrix}1 & 0\\j & 0\\0 & 1\\0 & 1\end{bmatrix}$
$\frac{1}{2}\begin{bmatrix}1 & 0\\j & 0\\0 & 1\\0 & -1\end{bmatrix}$ TABLE 9-continued

| Index 8 to 15 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |

Referring to [Table 8] and [Table 9], codebook index 16 to 19 may indicate the retransmission of TB1 and codebook index 20 t0 23 may indicate the retransmission of TB2, respectively. The other indices are for simultaneous retransmission of TB1 and TB2.

For example, if transmission rank is higher than 1, codebook index 9 indicates the simultaneous retransmission of TB1 and TB2. For another example codebook index 17 indicates the retransmission of TB1 and codebook index 21 indicates the retransmission of TB2, respectively, if the transmission rank is 1.

Structures of eNB and UE

A UE and an eNB (femto BS or macro BS) for implementing the above-described exemplary embodiments of the present invention will be described below.

The UE may serve as a transmitter on an uplink and as a receiver on a downlink, whereas the eNB may serve as a receiver on the uplink and as a transmitter on the downlink. Thus the UE and the eNB each may include a transmitter and a receiver for data transmission and reception.

The transmitter and the receiver each may include a processor, a module, a part and/or means to implement the afore-described exemplary embodiments of the present invention. Especially the transmitter and the receiver each may include a module (or means) for encrypting a message, a module for interpreting an encrypted message, and an antenna for transmitting and receiving messages. An example of the transmitter and the receiver will be described with reference to FIG. 14.

Figure 14:
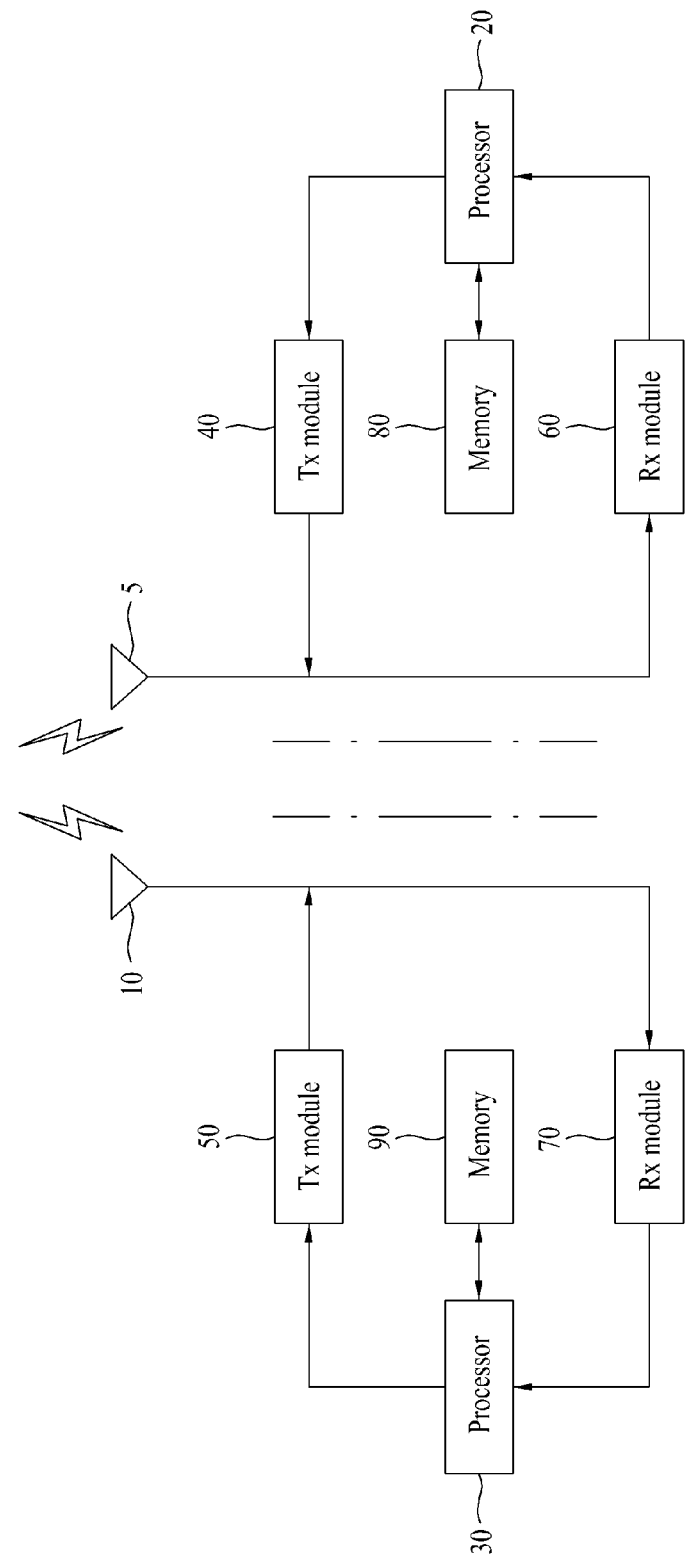
FIG. 14 is a block diagram of a transmitter and a receiver according to an exemplary embodiment of the present invention.

FIG. 14 is a block diagram of a transmitter and a receiver according to an exemplary embodiment of the present invention.

Referring to FIG. 14, the transmitter and the receiver are shown on the left and right sides, respectively. The transmitter and the receiver may include antennas 5 and 10, processors 20 and 30, Transmission (Tx) modules 40 and 50, Reception (Rx) modules 60 and 70, and memories 80 and 90, respectively. The components of the transmitter are counterparts of the components of the receiver.

The antennas 5 and 10 transmit signals generated from the Tx modules 40 and 50 over the air, or output external radio signals to the Rx modules 60 and 70. When MIMO is supported, two or more antennas may be used.

An antenna, a Tx module, and an Rx module may collectively form a Radio Frequency (RF) module.

The processors 20 and 30 provide overall control to the transmitter and the receiver. For example, the processors 20 and 30 may perform a control function according to the exemplary embodiments of the present invention, a variable Media Access Control (MAC) frame control function based on service characteristics and a propagation environment, a handover function, and an authentication and encryption function. Especially the processor of the transmitter may include a plurality of HARQ processes, HARQ buffers corresponding to the respective HARQ buffers, and HARQ entities for controlling the HARQ processes and the HARQ buffers. The processor of the transmitter may provide overall control for the afore-described uplink MIMO transmissions through these HARQ entities.

For example, the processor of the transmitter (i.e. the UE) may receive a control channel (e.g. a PDCCH) from the receiver by controlling the RF module and determine a transmission to be carried out during a current TTI based on a transmission rank using information included in the received control channel. Specifically, the processor of the transmitter may acquire uplink scheduling information from the PDCCH and determine using an ACK/NACK and NDIs whether the receiver has successfully receives previously transmitted data of an HARQ process corresponding to the current TTI and whether data to be transmitted currently is new data. In addition, the processor of the transmitter may provide overall control to operations according to the afore-described exemplary embodiments of the present invention.

The Tx modules 40 and 50 may process transmission data scheduled by the processors 20 and 30 in a predetermined coding and modulation scheme and output the processed transmission data to the antennas 5 and 10. Particularly, the Tx module of the UE may include a codeword-stream mapping module for mapping one or more codewords to one or more streams and a stream-antenna mapping module for mapping one or more streams output from the stream-codeword mapping module to a plurality of antennas.

The Rx module 60/70 reconstructs a radio signal externally received via the antenna 5/10 into original data by performing decoding and demodulation on the radio signal and is then able to deliver the reconstructed original data to the processor 20/30.

A program for processing and control of the processor 20/30 can be stored in the memory 80/90. And, the memory 20/30 can perform a function for temporary storage of inputted/outputted data. Moreover, the memory 80/90 can include at least one storage medium of such a type as a flash memory type, a hard disk type, a multimedia card micro type, a card type of memory (e.g., SD memory, XD memory, etc.), a Random Access Memory (RAM) type, an SRAM (Static Random Access Memory type), a Read-Only Memory (ROM) type, an EEPROM (Electrically Erasable Programmable Read-Only Memory) type, a PROM (Programmable Read-Only Memory) type, a magnetic memory type, a magnetic disc type, and optical disc type, and the like.

Meanwhile, a base station uses at least one of the above mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function and the like or can further include separate means, modules and/or parts for performing these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Moreover, claims failing to be explicitly cited in-between are combined to construct new embodiments or can be included as new claims by Amendment after filing the application.

INDUSTRIAL APPLICABILITY

Accordingly, the present invention is applicable to various wireless access systems. And, 3GPP (3rd generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

The invention claimed is:

1. A method for performing a Hybrid Automatic Repeat reQuest (HARQ) operation at a transmitter in a Multiple Input Multiple Output (MIMO) system supporting a rank of 1 or higher, the method comprising:
    transmitting a plurality of unit data blocks to a receiver;
    receiving from the receiver a control channel signal and a block indicator,
    wherein the control channel signal includes first feedback information indicating whether the transmission of the plurality of unit data blocks is successful, and
    wherein the block indicator indicates at least one unit data block to be transmitted again among the plurality of unit data blocks and is included in a predetermined index of a predetermined Modulation and Coding Scheme (MCS) table; and
    transmitting a first unit data block of the plurality of unit data blocks in one Transmission Time Interval (TTI) based on the block indicator when the first feedback information indicates that the transmission of all of the unit data blocks has failed and a rank is changed to a rank 1,
    wherein the block indicator indicates the first unit data block,
    wherein the predetermined MCS table comprises a first MCS index and a second MCS index,
    wherein the first MCS index is used to determine an MCS to use for the plurality of unit data blocks, and
    wherein the second MCS index is used as the block indicator to indicate the first unit data block to be retransmitted when the rank is changed to rank 1.

2. The method according to claim 1, wherein the first feedback information indicating the failure of the transmission of the plurality of unit data blocks is a Negative ACKnowledgment (NACK), and
    wherein the transmission of at least one unit data block of the plurality of unit data blocks comprises:
        transmitting the first unit data block among the plurality of unit data blocks to the receiver; and
        receiving from the receiver second feedback information indicating whether the transmission of the first unit data block is successful or failed.

3. The method according to claim 2, wherein the transmission of the first unit block and the reception of second feedback information are repeated until the second feedback information is an ACKnowledgment (ACK).

4. The method according to claim 3, wherein if the second feedback information is an ACK,
    wherein the transmission of the first unit block and the reception of second feedback information comprises:
        transmitting a second unit data block among the plurality of unit data blocks to the receiver.

5. A User Equipment (UE) for supporting a rank of 1 or higher, the UE comprising:
    a processor; and
    a Radio Frequency (RF) module configured to support a plurality of antennas and transmit and receive radio signals to and from an external device under control of the processor,
    wherein the processor is configured to:
        control the RF module to transmit a plurality of unit data blocks to a Base Station (BS),
        control the RF module to receive from the BS a control channel signal and a block indicator,
        wherein the control channel signal includes first feedback information indicating whether the transmission of the plurality of unit data blocks is successful, and
        wherein the block indicator indicates at least one unit data block to be transmitted again among the plurality of unit data blocks and is included in a predetermined index of a predetermined Modulation and Coding Scheme (MCS) table, and
    control the RF module to transmit a first unit data block of the plurality of unit data blocks in one Transmission Time Interval (TTI) based on the block indicator when the first feedback information indicates that the transmission of all of the unit data blocks has failed and a rank is changed to a rank 1,
    wherein the block indicator indicates the first unit data block,
    wherein the predetermined MCS table comprises a first MCS index and a second MCS index,
    wherein the first MCS index is used to determine an MCS to use for the plurality of unit data blocks, and
    wherein the second MCS index is used as the block indicator to indicate the first unit data block to be retransmitted when the rank is changed to rank 1.

6. The UE according to claim 5,
    wherein the first feedback information indicating the failure of the transmission of the plurality of unit data blocks is a Negative ACKnowledgment (NACK), and
    wherein the processor is further configured to control the RF module to transmit the first unit data block among the plurality of unit data blocks to the BS, until the processor receives from the BS second feedback information indicating that the transmission of the first unit data block is successful.

7. The UE according to claim 6, wherein the processor is further configured to control the RF module to transmit a second unit data block among the plurality of unit data blocks to the BS, if the second feedback information indicating that the transmission of the first unit data block is successful is received.

8. The UE according to claim 5, wherein the control channel signal is a Physical Downlink Control CHannel (PDCCH) signal.

* * * * *